Jan. 7, 1936.  G. E. BARNHART  2,026,727
AIRFOIL CONSTRUCTION
Filed March 25, 1933
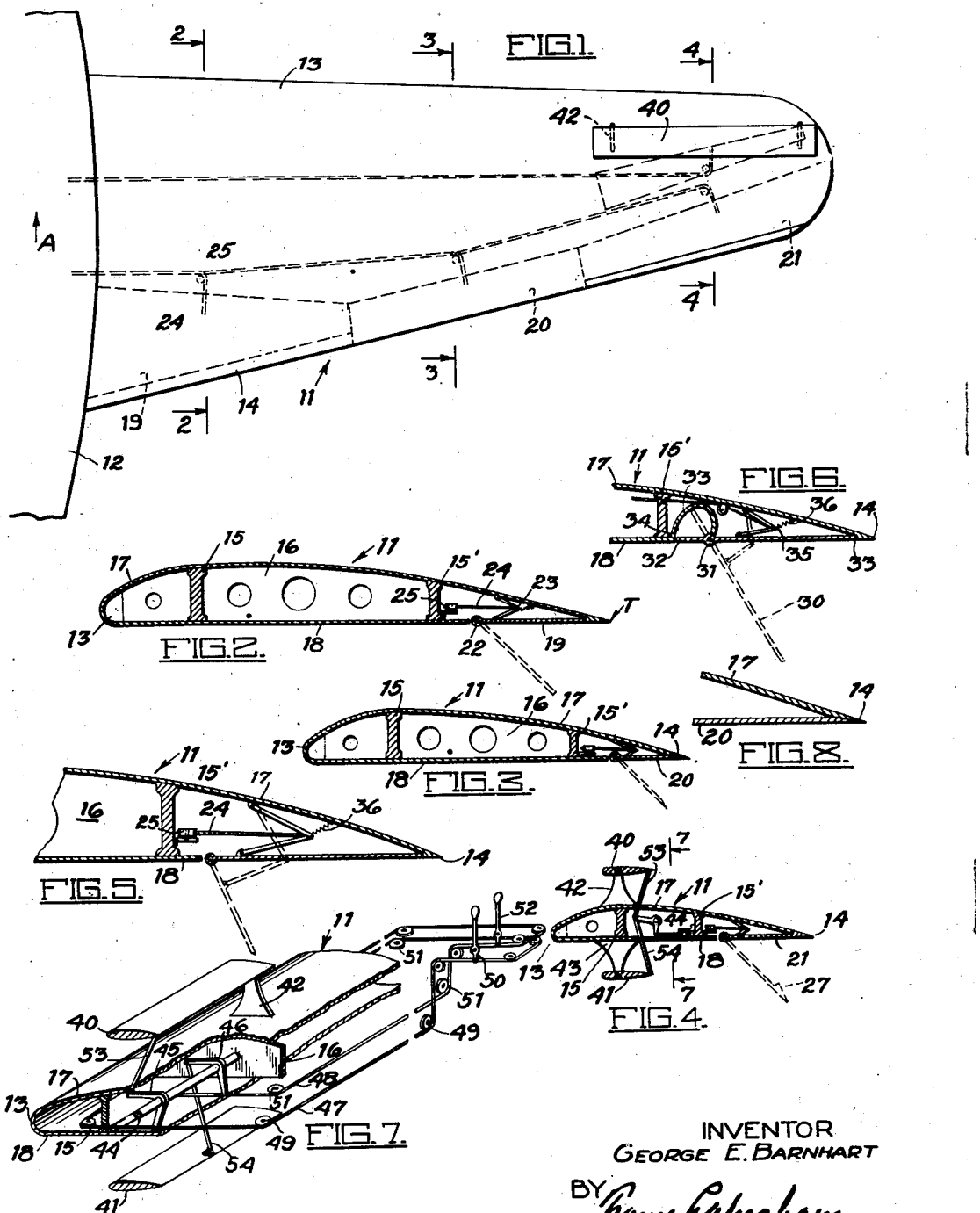
INVENTOR
GEORGE E. BARNHART
BY
ATTORNEY Patented Jan. 7, 1936

2,026,727

UNITED STATES PATENT OFFICE 2,026,727

AIRFOIL CONSTRUCTION

George E. Barnhart, Pasadena, Calif.

Application March 25, 1933, Serial No. 662,746

9 Claims. (Cl. 244—29)

This invention has to do in a general way with aircraft of the heavier than air type, and has as its primary object the production of improvements in the airfoil structure of such aircraft which will facilitate the handling of same and which will greatly reduce the hazards attending the take-off and the landing of airplanes.

In this connection, the device contemplated by this invention is especially valuable in connection with airplanes which are designed for extremely high speed in that it permits the pilot to optionally reduce the speed and increase the lift during landing and take-off. It also facilitates maneuvering planes of this type. For example, it permits operation of a normally high speed military plane at slow speeds for bomb dropping, etc.

More specifically the device, contemplated by this invention, relates to improvements in the wing structure in that it contemplates the use of flaps hinged or pivotally mounted on the underside of the wing, such flaps being pivoted at or near their leading edges and having their trailing edges normally substantially coincident with the trailing edges of the wings. In other words, the device contemplated by this invention embodies a wing structure having a rigid top surface and having a flap which normally forms part of the underside of the wing but which may optionally be swung downwardly to increase the head resistance or drag and also increase the lift of the wing. In this connection, I have discovered that for most satisfactory operation, the flaps must be designed and constructed so as to permit their downward swinging movement to an angle which is in excess of 40° with the normal position of the flap.

It is a further feature of a preferred form of my invention that the airfoil constituting the flap is made so as to wash the air inwardly toward the center of the wing from both the inner edge adjacent the fuselage and the tip or outer edge of the wing. To accomplish this result, I prefer to employ a plurality of flaps, preferably three, the inner flap being arranged so as to converge from the fuselage toward the trailing edge of the wing, and the outer or tip flap being arranged so as to converge from the tip of the wing toward the trailing edge or toward an intermediate flap. It is a further feature of this invention that these flaps are operable independently of each other so as to give a greater flexibility of control.

It is a further object of this invention to provide a flap structure which extends the full length of the wing, and in this connection my invention contemplates a novel type of aileron which is preferably mounted either above or below the wing in a suitable aileron supporting structure. For some purposes it may even be desirable to have ailerons both above and below the wings, such ailerons being operable either in connection with or independently of each other. Furthermore, it is desirable for most efficient action in some instances to have the ailerons disposed at an angle with the leading edge of the wing, and such construction is also contemplated by my invention.

It is a further object of this invention to produce a flap of somewhat modified construction which is pivoted on an axis intermediate its leading and trailing edges so that the wind pressure against the flap balances on either side of the axis, thereby reducing the torque in the flap and assisting in holding the flap in the desired position. I consider it preferable in the use of a balanced flap of this type to place the flap axis in the plane of the undersurface of the wing and to provide a pocket in the wing above the leading edge of the flap which is constructed so as to be in continuous engagement with the leading edge of the flap as it is swung to its angular position. Other types of balanced construction may, of course, be employed without departing from the scope of my invention.

The details in the construction of a preferred form of my invention, together with other objects attending its production, will be best understood from the following description of the accompanying drawing which is chosen for illustrative purposes only, and in which—

Fig. 1 is a plan view showing an airfoil structure or an airplane wing in connection with a portion of the fuselage;

Fig. 2 is a sectional view taken in the plane represented by the line 2—2 in Fig. 1;

Fig. 3 is a sectional view taken in the plane represented by the line 3—3 in Fig. 1;

Fig. 4 is a sectional view taken in the plane represented by the line 4—4 in Fig. 1;

Fig. 5 is an enlarged section showing a fragment of the structure illustrated in Fig. 2;

Fig. 6 is fragmentary sectional elevation showing a modified form of flap construction;

Fig. 7 is a fragmentary perspective view with parts broken away illustrating the details in the construction of ailerons and aileron control mechanism contemplated by this invention; and Fig. 8 is an enlarged section of the trailing edge construction of the flap and the wing shown in Fig. 3.

More particularly describing the invention as herein illustrated, reference numeral 11 indicates an airplane wing or an airfoil structure which is shown as being mounted on the side of a fuselage, a portion of which is indicated by reference numeral 12.

The airplane, of which the parts just referred to are a portion, is designed to travel in the direction of the arrow A in Fig. 1, the leading edge of the wing 11 therefor being indicated by reference numeral 13 and the trailing edge by reference numeral 14. As will appear from the sectional views, the wing structure comprises spars of any conventional type indicated by reference numerals 15 and 15' and beams which are indicated generally by reference numeral 16.

The wing structure is covered by a fabric, metal, or other suitable skin, indicated by reference numeral 17, such skin being formed so as to constitute a substantially fixed top surface and a substantially fixed bottom surface, the latter being indicated by reference numeral 18, and extending to a point either coincident or slightly beyond the rear spar 15'.

Reference numerals 19, 20, and 21, indicate flaps which I may term an inner flap, an intermediate flap, and a tip flap, respectively. The inner flap 19, which is hinged or pivoted to the underside of the wing is arranged so as to form a part of the bottom surface of the wing when it is closed, and is constructed so that its trailing edge terminates a slight distance ahead of the trailing edge T in the wing section which contains this flap. In other words, the wing itself extends beyond the trailing edge of the flap.

For the purpose of actuating the flap 19, I provide a broken link, or toggle, indicated generally by reference numeral 23, such toggle having one link pivoted to the flap and the other to a suitable brace member in the upper portion of the wing. As is best illustrated in Fig. 5, this toggle is adapted to be straightened out for swinging the flap downwardly by means of a cable 24 which extends over a pulley 25 from which it is passed over suitable guide pulleys to a lever or wheel, or other suitable operating mechanism situated in the cockpit.

For most efficient action, the leading or forward edge of the flap 19 converges from a point adjacent the fuselage toward the trailing edge of the wing or toward the intermediate flap 20. In this manner the airstream, as it passes along the fuselage and along the undersurface of the wing, is washed outwardly toward the midportion of the wing by the flap 19. The flap 20 is preferably formed and mounted so that its leading or forward edge is substantially parallel to the trailing edge of the wing or airfoil structure. The flap 20, as will be seen from Fig. 3, is constructed so that its trailing edge, when the flap is folded up, is coincident with the trailing edge of the wing. The mechanism for operating this flap may be identical with the mechanism for operating the flap 19.

The flap 21, which I have termed the tip flap, is formed and mounted in the wing so that its forward or leading edge converges from the tip of the wing toward the intermediate flap. In other words, the two extreme flaps 19 and 21 both wash the air inwardly toward the center of the wing so that the unit which, in this form of the invention comprises three flaps, is of maximum effectiveness. The flap 21, as shown in Fig. 4, is constructed so that its trailing edge extends beyond the actual trailing edge of the top of the wing, and under these circumstances the flap is provided with a shoulder and tapered projection, indicated by reference numeral 27, the top surface of which conforms with the top of the wing so that a uniform airfoil surface is provided when the flap is closed.

The control mechanism for the flap 21 is also shown as being identical with the actuating mechanism on the flaps 19 and 20.

By arranging the flaps so that the inner flap and the tip flap converge toward the intermediate flap, I obtain the most efficient action in the flaps for most purposes. It is to be understood, however, that the characteristic of any individual flap may be embodied in a flap or series of flaps extending the entire length of the wing. For example, I may employ a flap or series of flaps which, like the flap 19, has a leading edge which converges uniformly toward the trailing edge from the fuselage to the tip of the wing. I may also employ a flap, or series of flaps, like the intermediate flap, the leading edge of which is parallel with the trailing edge. I may also employ a series of flaps, or a flap, extending the entire length of the wing, the leading edge of which converges toward the trailing edge of the wing from the tip of the wing to the fuselage.

In Fig. 6, I show a modified form of flap 30 which is pivoted as indicated at 31 on an axis which lies between the leading or forward edge 32 and the trailing edge 33 of the flap. In connection with this flap, I provide in the wings what I may term a pocket member 33 which has an inner surface 34 conforming with the radius through which the forward edge of the flap travels so that it always forms an air seal during the swinging movement of the latter. With the latter type of construction, the pressure against the downwardly extending portion of the flap is balanced to a certain extent, depending upon the area above the axis by the air pressure against the portion of the flap which extends into the pocket. This facilitates the operation of the flap and reduces the stresses on the members which are provided to hold the flap open.

The flap 30 is provided with an actuating mechanism generally indicated by reference numeral 35 which is shown as being similar to the actuating mechanism shown in Figs. 2 and 4 inclusive. With regard to this actuating mechanism, it might be pointed out that an additional cable may be provided for closing the flap, or I may employ a spring as indicated by reference numeral 36 in Figs. 5 and 6.

In Fig. 7, I show an improved form of aileron construction which is especially designed for use in connection with a wing equipped with a flap or flaps of the type contemplated by this invention. In this particular form of my invention, I show two ailerons indicated by reference numerals 40 and 41 mounted above and below the wing respectively, where they are supported by aileron supporting brackets 42 and 43. These ailerons may be tied together so that they always work in conjunction with each other, but for the purpose of giving greater flexibility to the control of the airplane, I prefer to actuate the ailerons independently of each other, and as one form of actuating mechanism I show the shaft, or other suitable support, 44 which is mounted between a pair of beams in the wing structure and which carries a pair of rotatable bell cranks 45 and 46. These bell cranks are rotatably mounted upon the shaft and are adapted to be actuated in opposite directions by means of cables 47 and 48 respectively. The cable 47 extends in both directions from the bell crank 45 over pulleys, generally indicated at 49, to a lever member 50. Similarly the cable 48 extends in both directions from the bell crank 46 over pulleys 51 to a lever member 52. The other end of the bell crank 45 is attached to a link member 53 which extends through a slot in the top covering of the wing and has its upper end pivotally attached to the aileron 40. The aileron 41 is similarly provided with a link member 54 which is secured to the bell crank 46.

From this construction it will be seen that the ailerons can be independenaly operated by manipulation of the levers 50 and 52. If desired, these lever members may be constructed and arranged in a manner such that they can be locked together for simultaneously operating the ailerons.

For most successful operation, I have found it to be important that the ailerons be situated between the center of pressure locations for high and low speeds. It will be observed that in the form shown the ailerons are situated near the leading edges of the wings.

It is also desirable for some purposes to arrange the ailerons so that they are disposed substantially normal to the direction of air flow across the wing instead of being parallel to the trailing edge of the wing as in the usual construction. This feature is shown in the bottom aileron 41. It will be understood, however, that the same construction may be employed in both ailerons.

It will be understood that both wings of the airplane are of identical construction and the control mechanism may be constructed so as to provide independent control for each flap or to simultaneously control the corresponding flaps on opposite wings, or to simultaneously control all of the flaps on both wings. The ailerons for the separate wings must, of course, be independently operable, but as pointed out above, the two ailerons on one wing may, if desired, be operated simultaneously.

It is to be understood that, while I have herein above described and illustrated one preferred embodiment of my invention, the invention is not limited to the precise construction described above, but includes within its scope whatever changes fairly come within the spirit of the appended claims.

I claim as my invention:

1. In combination with an airplane wing having a substantially fixed top surface: a plurality of flaps hinged in the underside of said wing at a substantial distance ahead of the trailing edge of said wing, said flaps being of a width such that their trailing edges are substantially coincident with the trailing edge of said wing; and means for independently operating said flaps, said flaps being arranged so as to wash the air inwardly from the root of the wing and the tip of the wing toward the center of the wing when they are open.

2. In combination with an airplane wing having a substantially fixed top surface: an inner flap, a tip flap, and an intermediate flap, all swingably mounted in the underside of said wing at their leading edges with their trailing edges substantially parallel with the trailing edge of said wing; and means for swinging the trailing edges of said flaps downwardly away from the trailing edge of said wing, said inner flap being arranged with its leading edge angularly disposed with the leading edge of said intermediate flap so as to wash the air outwardly from the fuselage toward said intermediate flap.

3. In combination with an airplane wing having a substantially fixed top surface: an inner flap, a tip flap, and an intermediate flap, all swingably mounted in the underside of said wing at their leading edges with their trailing edges substantially parallel with the trailing edge of said wing; and means for swinging the trailing edge of said flaps downwardly away from the trailing edge of said wing, said intermediate flap being arranged with its leading edge substantially parallel with the trailing edge of said wing, and said inner flap and said tip flap being arranged with their leading edges converging toward the leading edge of said intermediate flap.

4. In combination with an airplane wing having a substantially fixed top surface: an inner flap, a tip flap, and an intermediate flap, all swingably mounted in the underside of said wing at their leading edges with their trailing edges substantially coincident with the trailing edge of said wing; and means for swinging the trailing edge of said flaps downwardly away from the trailing edge of said wing, said inner flap and said tip flap being arranged so that their leading edges converge toward said intermediate flap.

5. In combination with an airplane wing having a substantially fixed upper surface: a flap pivotally mounted on the underside of said wing with its trailing edge substantially parallel with the trailing edge of said wing, said flap being pivoted on an axis which lies between the leading edge and the trailing edge of said wing and converges from a point nearest the fuselage toward a point in said trailing edge.

6. In combination with an airplane wing having a substantially fixed top surface: a plurality of flaps hinged in the underside of said wing at a substantial distance ahead of the trailing edge of said wing and arranged so as to wash the air inwardly from the root of the wing and the tip of the wing toward the center of the wing when they are open; and means for independently operating said flaps.

7. In combination with an airplane wing having a substantially fixed top surface: an inner flap, a tip flap, and an intermediate flap, all swingably mounted in the underside of said wing at their leading edges with their trailing edges substantially parallel with the trailing edge of said wing; and means for swinging the trailing edges of said flaps downwardly away from the trailing edge of said wing, said inner flap and said tip flap being arranged so that their leading edges converge toward said intermediate flap.

8. An airplane wing of streamline airfoil section comprising in combination: a fixed portion; a flap underlying the fixed portion, normally substantially coincident with the lower face of the wing, and pivoted to swing downwardly, said flap being arranged with its pivotal axis extending from the root of the wing toward a point in the trailing edge of the wing; and means for actuating said flap.

9. In combination with an airplane wing having a substantially fixed top surface: a plurality of flaps hinged in the underside of said wing and arranged so as to wash the air inwardly from the root of the wing and the tip of the wing toward the center of the wing when they are open; and means for operating said flaps.

GEORGE E. BARNHART.